United States Patent
Montgomery et al.

(10) Patent No.: US 8,769,911 B2
(45) Date of Patent: Jul. 8, 2014

(54) CONNECTORS AND ROOF ANCHOR SYSTEMS COMPRISING A CONNECTOR

(75) Inventors: Brian C. Montgomery, Mercer, PA (US); Justin Shane Patton, Franklin, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/814,796

(22) PCT Filed: Aug. 9, 2011

(86) PCT No.: PCT/US2011/047065
§ 371 (c)(1),
(2), (4) Date: Mar. 20, 2013

(87) PCT Pub. No.: WO2012/021505
PCT Pub. Date: Feb. 16, 2012

(65) Prior Publication Data
US 2013/0167470 A1  Jul. 4, 2013

Related U.S. Application Data

(60) Provisional application No. 61/372,675, filed on Aug. 11, 2010.

(51) Int. Cl.
*E04B 1/38* (2006.01)
*E04C 5/00* (2006.01)

(52) U.S. Cl.
USPC .......................................................... 52/705

(58) Field of Classification Search
USPC .......................................................... 52/705
See application file for complete search history.

(56) References Cited

U.S. PATENT DOCUMENTS

2002/0035811 A1* 3/2002 Heuel ........................ 52/506.05

FOREIGN PATENT DOCUMENTS

| DE | 1 189 323 B | 3/1965 |
| EP | 0 777 057 A1 | 6/1997 |
| WO | 2007/036693 A1 | 4/2007 |

OTHER PUBLICATIONS

International Preliminary Report on Patentability and Written Opinion dated Feb. 21, 2013.

*Primary Examiner* — Mark Wendell
(74) *Attorney, Agent, or Firm* — Wood, Phillips, Katz, Clark & Mortimer

(57) ABSTRACT

A connector (10,10',10") for connecting to an extending member includes an interface member (20,20',20"). The interface member (20,20',20") includes an interface surface (22,22',22"), a first extending abutment member (26a,26a', 26a") extending from a surface (23,23',23") opposed to the interface surface (22,22',22"), a second extending abutment member (26b,26b',26b") spaced from the first extending abutment member (26a,26a',26a") and extending from the surface (23,23',23") opposed to the interface surface (22,22', 22"), and at least a first passage (24,24',24") passing therethrough from the interface surface (22,22',22") to the surface (23,23',23") opposing the interface surface (22,22',22") between the first extending abutment member (26a,26a', 26a") and the second extending abutment member (26b,26b', 26b"). The connector (10,10',10") further includes an abutment member (40,40',40") including at least a first threaded passage (42,42',42") and at least a first threaded member (30,30',30") adapted to extend through the first passage (24, 24',24") in the interface surface (22,22',22") to engage the first threaded passage (42,42',42") of the abutment member (40,40',40") on the side of the surface (23,23',23") opposed to the interface surface (22,22',22"). The connector (10,10',10") further includes a first extending contact member (50a,50a', 50a") including a first cooperating section (52a,52a',52a") and a first contact surface (58a,58a',58a") on an end thereof. The first cooperating section (52a,52a',52a") is movably positioned between and abutted by the abutment member (40,40',40") and the first extending abutment member (26a, 26a',26a") so that the first contact surface (58a,58a',58a") of the first extending contact member (50a,50a',50a") can be moved between an open position and a closed position as the distance between the surface (23,23',23") opposing the interface surface (22,22',22") and the abutment member (40,40', 40") is adjusted via the first threaded member (30,30',30"). The connector (10,10',10") also includes a second extending contact member (**50*b*,50*b'*,50*b"*) including a second cooperating section (52*b*,52*b'*,52*b"*) and a second contact surface (58*b*,58*b'*,58*b"*) on an end thereof. The second cooperating section (52*b*,52*b'*,52*b"*) is movably positioned between and abutted by the abutment member (40,40',40") and the second extending abutment member (26*b*,26*b'*,26*b"*) so that the second contact surface (58*b*,58*b'*,58*b"*) of the second extending contact member (50*b*,50*b'*,50*b"*) can be moved between an open position and a closed position as the distance between the surface (23,23',23") opposing the interface surface (22, 22',22") and the abutment member (40,40',40") is adjusted via the first threaded member (30,30',30"**).

17 Claims, 10 Drawing Sheets

CONNECTORS AND ROOF ANCHOR SYSTEMS COMPRISING A CONNECTOR

CROSS-REFERENCE TO RELATED APPLICATIONS

This application claims the benefit of the filing date of U.S. Provisional Ser. No. 61/372,675, filed Aug. 11, 2010, which is hereby incorporated by reference in its entirety.

BACKGROUND

The following information is provided to assist the reader to understand the technology described below and certain environments in which such technology can be used. The terms used herein are not intended to be limited to any particular narrow interpretation unless clearly stated otherwise in this document. References set forth herein may facilitate understanding of the technology or the background thereof. The disclosure of all references cited herein are incorporated by reference.

A number of connector or clamping mechanisms or systems exist for connecting or clamping to extending members such as standing seams for roofs. However, many such mechanisms or systems are limited to use with a certain type and/or size of standing seam or other extending member. Moreover, many such mechanisms or systems are cumbersome to use or provide insufficient load resistance for use, for example, in fall protections systems and methods wherein relatively large dynamic loads can be experienced and failure can lead to injury or death.

SUMMARY

In one aspect, a connector for connecting to an extending member includes an interface member. The interface member includes an interface surface, a first extending abutment member extending from a surface opposed to the interface surface, a second extending abutment member spaced from the first extending abutment member and extending from the surface opposed to the interface surface, and at least a first passage passing therethrough from the interface surface to the surface opposing the interface surface between the first extending abutment member and the second extending abutment member. The connector further includes an abutment member including at least a first threaded passage and at least a first threaded member adapted to extend through the first passage in the interface surface to engage the first threaded passage of the abutment member on the side of the surface opposed to the interface surface. The connector further includes a first extending contact member including a first cooperating section and a first contact surface on an end thereof. The first cooperating section is movably positioned between and abutted by the abutment member and the first extending abutment member so that the first contact surface of the first extending contact member can be moved between an open position and a closed position as the distance between the surface opposing the interface surface and the abutment member is adjusted via the first threaded member. The connector also includes a second extending contact member including a second cooperating section and a second contact surface on an end thereof. The second cooperating section is movably positioned between and abutted by the abutment member and the second extending abutment member so that the second contact surface of the second extending contact member can be moved between an open position and a closed position as the distance between the surface opposing the interface surface and the abutment member is adjusted via the first threaded member.

The first extending abutment member can, for example, extend at an angle from the surface opposed to the interface surface toward the second extending abutment member. The first extending abutment member can, for example, include an arced surface to contact an arced channel (53a,53a',53a") formed in the first cooperating section of the first extending contact member. The second extending abutment member can also extend at an angle from the surface opposed to the interface surface toward the first extending abutment member. The second extending abutment member can, for example, include an arced surface to contact an arced channel formed in the second cooperating section of the second extending contact member.

In a number of embodiments, the arced channel of the first cooperating section extends less than 180°, and the arced channel of the second cooperating section extends less than 180°.

The interface member can, for example, further include a second passage (24,24',24") passing therethrough from the interface surface to the surface opposing the interface surface between the first extending abutment member and the second extending abutment member. The abutment member can, for example, include a second threaded passage (42,42',42"). The connector can further include a second threaded member adapted to extend through the second passage (24,24',24") in the interface member to engage the second threaded passage (42,42',42") of the abutment member. The first threaded member and the second threaded member can, for example, be further adapted to attach an item to the interface surface of the interface member.

The connector can, for example, further include at least one retention mechanism to retain at least one of the first extending contact member and the second contact member in an open position. The at least one retention mechanism (or more than one retention mechanism) can, for example, retain the first extending contact member in an open position and the second extending contact member in an open position.

In a number of embodiments, the retention mechanism includes an arced resilient member including a first end contacting the surface opposed to the interface surface and a second end contacting the surface opposed to the interface surface and positioned between the surface opposed to the interface surface and the abutment member. In a number of embodiments, a first arced section of the resilient member contacts the first extending contact member and a second arced section of the resilient member contacts the second extending contact member (biasing the first extending contact member and the second extending contact member in an open position).

The connector can, for example, further include at least one retaining member in operative connection with the interface member to abut the first cooperating section of the first extending contact member and retain the first cooperating section in operative connection with the interface member and the abutment member and to abut the second cooperating section of the second extending contact member and retain the second cooperating section in operative connection with the interface member and the abutment member.

The connector can, for example, include a first retaining member in operative connection with the interface member to abut the first extending contact member and retain the first cooperating section in operative connection with the interface member and a second retaining member in operative connection with the interface member to abut the second extending contact member and retain the second cooperating section in operative connection with the interface member.

In a number of embodiments, the first retaining member include a first bracket rotatably attached to the interface member and extending around the first extending contact member, and the second retaining member includes a second bracket rotatably attached to the interface member and extending around the second extending contact member.

The first bracket can, for example, be removable from connection with the interface member via at least one attachment member, and the second bracket can, for example, be removable from connection with the interface member via at least one attachment member.

In another aspect, a method of connecting an item to a standing seam of a roof includes: attaching at least one connector to the standing seam, wherein the connector includes an interface member. The interface member includes an interface surface, a first extending abutment member extending from a surface opposed to the interface surface, a second extending abutment member spaced from the first extending abutment member and extending from the surface opposed to the interface surface, and at least a first passage passing therethrough from the interface surface to the surface opposing the interface surface between the first extending abutment member and the second extending abutment member. The connector further includes an abutment member including at least a first threaded passage and at least a first threaded member adapted to extend through the first passage in the interface surface to engage the first threaded passage of the abutment member on the side of the surface opposed to the interface surface. The connector further includes a first extending contact member including a first cooperating section and a first contact surface on an end thereof. The first cooperating section is movably positioned between and abutted by the abutment member and the first extending abutment member so that the first contact surface of the first extending contact member can be moved between an open position and a closed position as the distance between the surface opposing the interface surface and the abutment member is adjusted via the first threaded member. The connector also includes a second extending contact member including a second cooperating section and a second contact surface on an end thereof. The second cooperating section is movably positioned between and abutted by the abutment member and the second extending abutment member so that the second contact surface of the second extending contact member can be moved between an open position and a closed position as the distance between the surface opposing the interface surface and the abutment member is adjusted via the first threaded member. The method further includes attaching the item to the interface surface of the at least one connector (for example, via the first threaded member). The item can, for example, be attached to the interface surface before the connector is attached to the standing seam.

In a further aspect, an anchor system for attachment to a roof including a standing seam includes a base, an anchor member attached to a first for upper surface of the base; and at least one connector as described above attached to a second or lower surface of the base and adapted to attach to the standing seam. In a number of embodiment, a plurality of like connectors are attached to the lower surface of the base.

In still a further aspect, connector for connecting to an extending member includes an interface member which includes an interface surface, a first extending abutment member extending from a surface opposed to the interface surface, and a second extending abutment member spaced from the first extending abutment member and extending from the surface opposed to the interface surface. An abutment member is in operative connection with the interface member and is positioned adjacent the surface opposed to the interface surface such that a distance between the abutment member and the surface opposed to the interface surface is adjustable. The connector further includes a first extending contact member including a first cooperating section and a first contact surface on an end thereof. The first cooperating section is movably positioned between and abutted by the abutment member and the first extending abutment member so that the first contact surface of the first extending contact member can be moved between an open position and a closed position as the distance between the surface opposing the interface surface and the abutment member is adjusted. The connector also includes a second extending contact member including a second cooperating section and a second contact surface on an end thereof. The second cooperating section is movably positioned between and abutted by the abutment member and the second extending abutment member so that the second contact surface of the second extending contact member can be moved between an open position and a closed position as the distance between the surface opposing the interface surface and the abutment member is adjusted.

The technology described herein, along with the attributes and attendant advantages thereof, will best be appreciated and understood in view of the following detailed description taken in conjunction with the accompanying drawings.

DETAILED DESCRIPTION

As used herein and in the appended claims, the singular forms "a," "an", and "the" include plural references unless the content clearly dictates otherwise. Thus, for example, reference to "an attachment member" includes a plurality of such attachment members and equivalents thereof known to those skilled in the art, and so forth, and reference to "the attachment member" is a reference to one or more such attachment members and equivalents thereof known to those skilled in the art, and so forth.

Figure 5A:
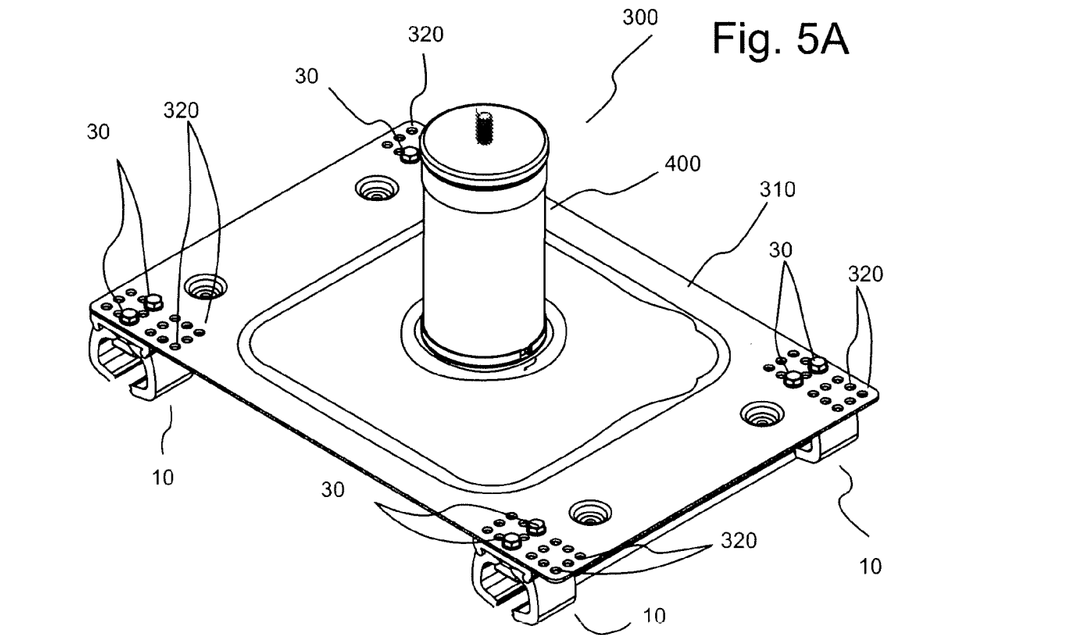
FIG. 5A illustrates a perspective view of several of the connectors of FIG. 1A connecting a base for a post.
Figure 5B:
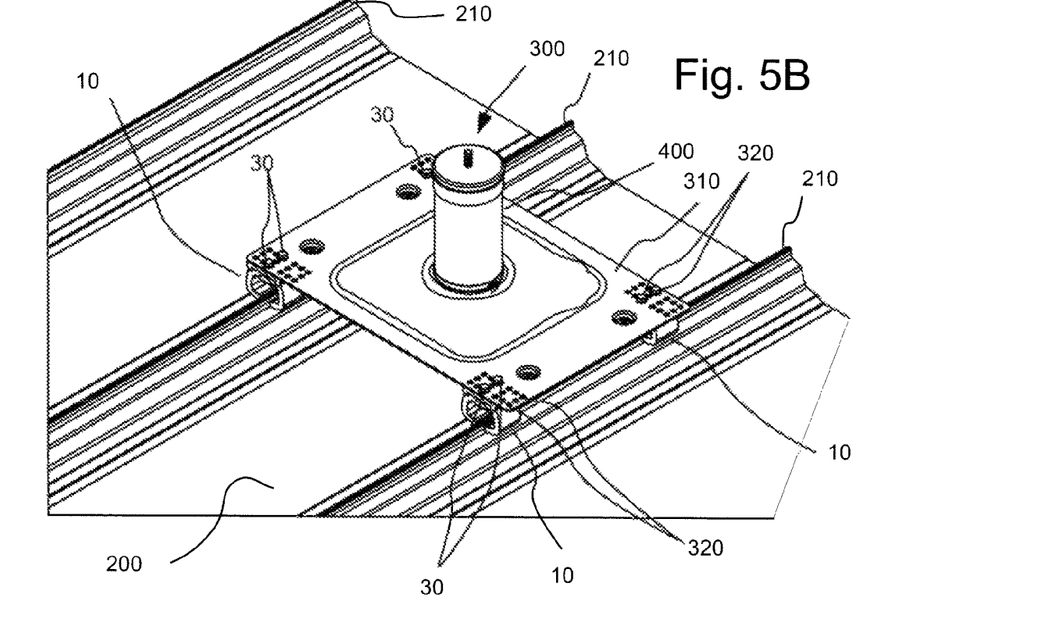
FIG. 5B illustrates a perspective view of several of the connector of FIG. 1A connecting a base for a post to standing seams of a roof.

FIGS. 1A through 6D illustrates a representative embodiment of a connector 10 which can, for example, be connected to extending elements such as standing seams 210 or a roof 200 as illustrated, for example, in FIGS. 5B and 5A. Connector 10 can, for example, be used in connection with fall protection systems. Such fall protection systems can, for example, include an anchorage system 300 to which a user attaches (either directly or indirectly via, for example, a lifeline attached to a fall protection safety harness worn by the user). As illustrated in FIGS. 5A and 5B, anchorage system 300 is attached to a plurality of standing seams 210 of roof 200 via connectors 10. In FIGS. 5A and 5B, several connectors 10 (four in the illustrated embodiment) are attached to a base or base plate 310 of anchorage system 300, which supports an anchorage system, member or device 400. In the illustrated embodiment, the anchorage system or device includes an extending post system 400. Such an anchorage system is, for example, described in U.S. Provisional Patent Application Ser. No. 61/372,643, entitled Energy Absorbers and Posts Including Energy Absorbers, filed on Aug. 11, 2010.

The representative embodiment of connector 10 includes an interface member 20 including an upper (in the illustrated orientation) or interface surface 22 to which an item to be attached to connector 10 is attached or interfaced. In the illustrated embodiment, the item is attached to interface member 20 via one or more threaded attachment members 30 (two in the illustrated embodiment). Interface member 20 includes one or more passages 24 (passing through interface member 20 from upper, interface surface 22 to a lower, opposing surface 23, which need not be directly opposing or parallel to interface surface 22) through which a threaded portion 32 of attachment member(s) passes. Passages 24 need not be threaded and in several embodiments, are not threaded. In several embodiments, passages 24 are formed to have a dimension larger then threaded portion 32. Threaded portion 32 cooperates with a cooperating threaded passage 42 in an abutment member 40 which is positioned below (in the illustrated orientation) interface member 20 or adjacent surface 23. Although a threaded attachment member or members 40 are used to place abutment member 40 in operative, adjustable connection with interface member 20 in the illustrated representative embodiment, one or more other attachment members or systems can be used.

Interface member 22 further includes a first extending abutment member 26a and a second extending abutment member 26b. First extending abutment member 26a and second extending abutment member 26b cooperate with a first cooperating section 52a and a second cooperating section 52b of extending contact or clamp members 50a and 50b, respectively. As, for example, illustrated in dashed lines FIG. 6D, first cooperating section 52a and second cooperating section 52b operate similarly to or in the manner of a wedge when loaded by abutment member 40.

In the embodiment illustrated in FIGS. 1A through 6D, first and second abutment members 26a and 26b are angled toward the centerline of connector 10 and have an arced, curved or rounded surface to contact cooperating seatings or channels 53a and 53b of contact members 50a and 50b, respectively. Over a range of positions of abutment member 40 cooperating sections 52a and 52b are captured between abutment member 40 and interface member 20, and contact members 50a and 50b can, for example, loosely rotate or pivot about axes $A_1$ and $A_2$, respectively (see FIG. 1C). First abutment member 26a and second abutment member 26b, as well as first cooperating section 52a and second cooperating section 52b extend along axis $A_1$ and $A_2$, respectively, although not necessarily coextensively therealong. In a number of embodiments, the arc of channels 53a and 53b contacting arced first abutment member 26a and arced second abutment member 26b, respectively, extends for no more than 180 degrees (or subtends an angle of no more than 180 degrees). In several embodiments, the arc of channels 53a and 53b extends less than 180 degrees. In such embodiments, first and second abutment members 26a and 26b are not captured by channels 53a and 53b and readily detach therefrom upon sufficient movement of abutment member 40 away from surface 23 of interface member 20 (or disconnection of abutment member 40 from threaded portion 32). Extending arc of channels 53a and 53b less than 180 degrees facilitates a wide range of pivoting of contact members 50a and 50b to an open position as, for example, illustrated in FIGS. 1B, 2B and 6A.

Thus, although seating first abutment member 26a and second abutment member 26b within channels 53a and 32b will not retain contact members 50a and 50b in connection with interface member 20, when abutment member 40 is connected to attachment member(s) 30 as illustrated, for example, in FIGS. 1A, 1B, 2A and 6A-6D, abutment member 40 and interface member 20 abut and capture first contact member 50a and second contact member 50b therebetween. Nonetheless, each of contact members 50a and 50b can be slid in the longitudinal directions of axes $A_1$ and $A_2$, respectively, to remove them from connection with the remainder of connector 10 when abutment member 40 is not in tightened (by drawing it toward surface 23 via attachment member(s) 30 or other attachment member(s)) abutting contact therewith. When, abutment member 40 is in tightened abutting contact with contact members 50a and 50b (as, for example, when connector 10 is in used to connect an item to roof seam 210 as illustrated in FIGS. 5A, 5B, 6C and 6D), frictional forces prevent such removal of contact members 50a and 50b.

In the illustrated embodiment of FIGS. 1A through 6B, abutment member 40 includes sloped abutment surfaces 44a and 44b. Surfaces 44a and 44b slope in a linear manner, but abutment surfaces 44a and 44b can, for example, slope in a curvilinear or curved manner. Abutment surfaces 44a and 44b contact cooperating abutment surfaces 56a and 56b of cooperating sections 52a and 52b of first contact member 50a and second contact member 50b, respectively (see, for example, FIGS. 2A and 2B). In the illustrated embodiment, cooperating abutment surfaces 56a and 56b are curved or curvilinear in shape. Abutment surfaces 56a and 56b can alternatively be angled in a linear manner.

Figures 1A, 1B, 1C:
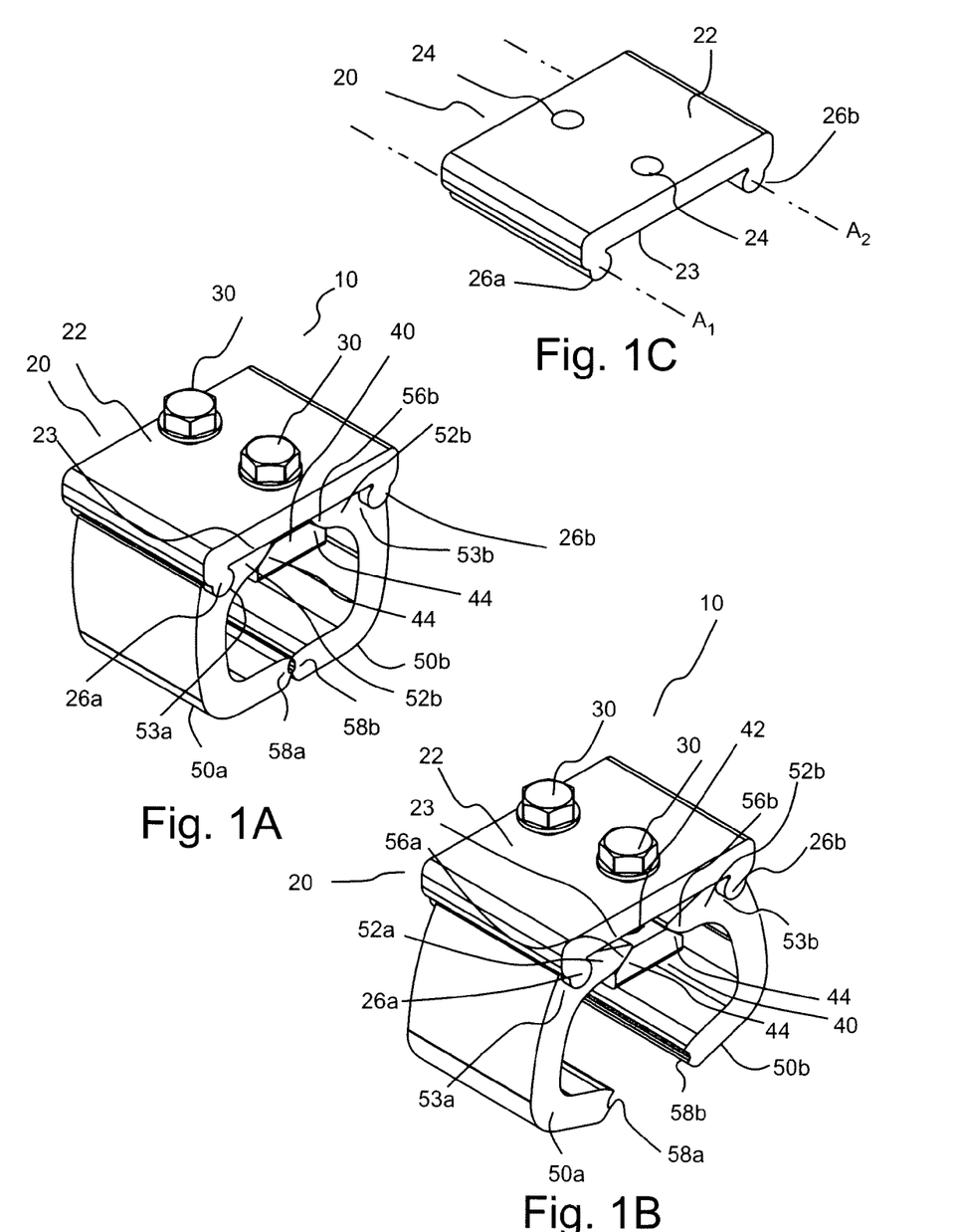
FIG. 1A illustrates a perspective view of an embodiment of a connector wherein the contact or clamp members are in a closed state.
FIG. 1B illustrates a perspective view of the connector of FIG. 1A wherein the contact or clamp members are in an open state.
FIG. 1C illustrates a perspective view of an item interface member of the connector of FIG. 1A disconnected from the remainder of the connector.
Figures 2A, 2B, 2C, 2D:
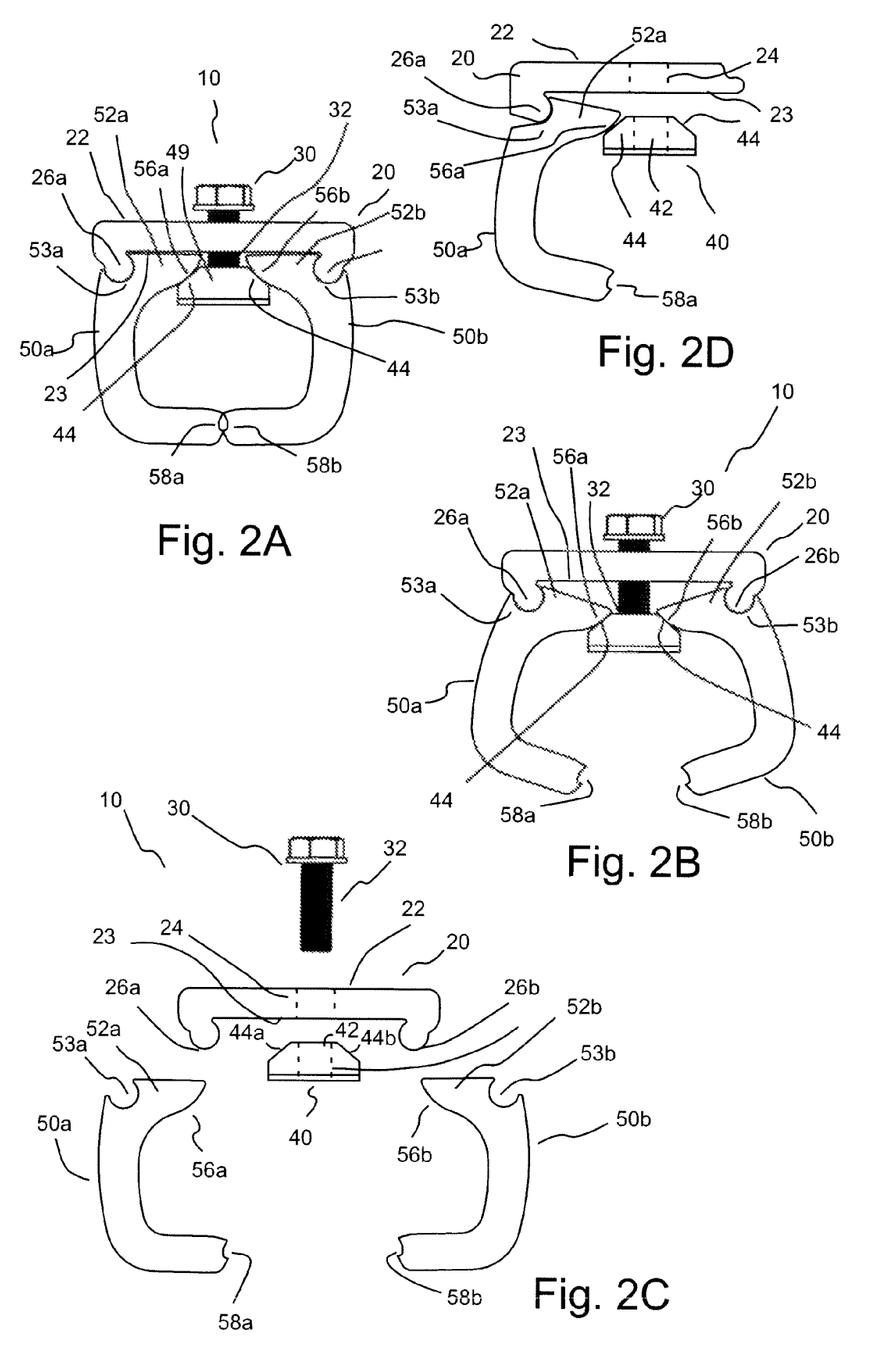
FIG. 2A illustrates a front view of the connector of FIG. 1A wherein the contact or clamp members are in a closed state.
FIG. 2B illustrates a front view of the connector of FIG. 1A wherein the contact or clamp members are in an open state.
FIG. 2C illustrates a front view of the connector of FIG. 1A in an exploded or disassembled state.
FIG. 2D illustrates a front, partial view of another embodiment of a connector.
Figures 3A, 3B, 4:
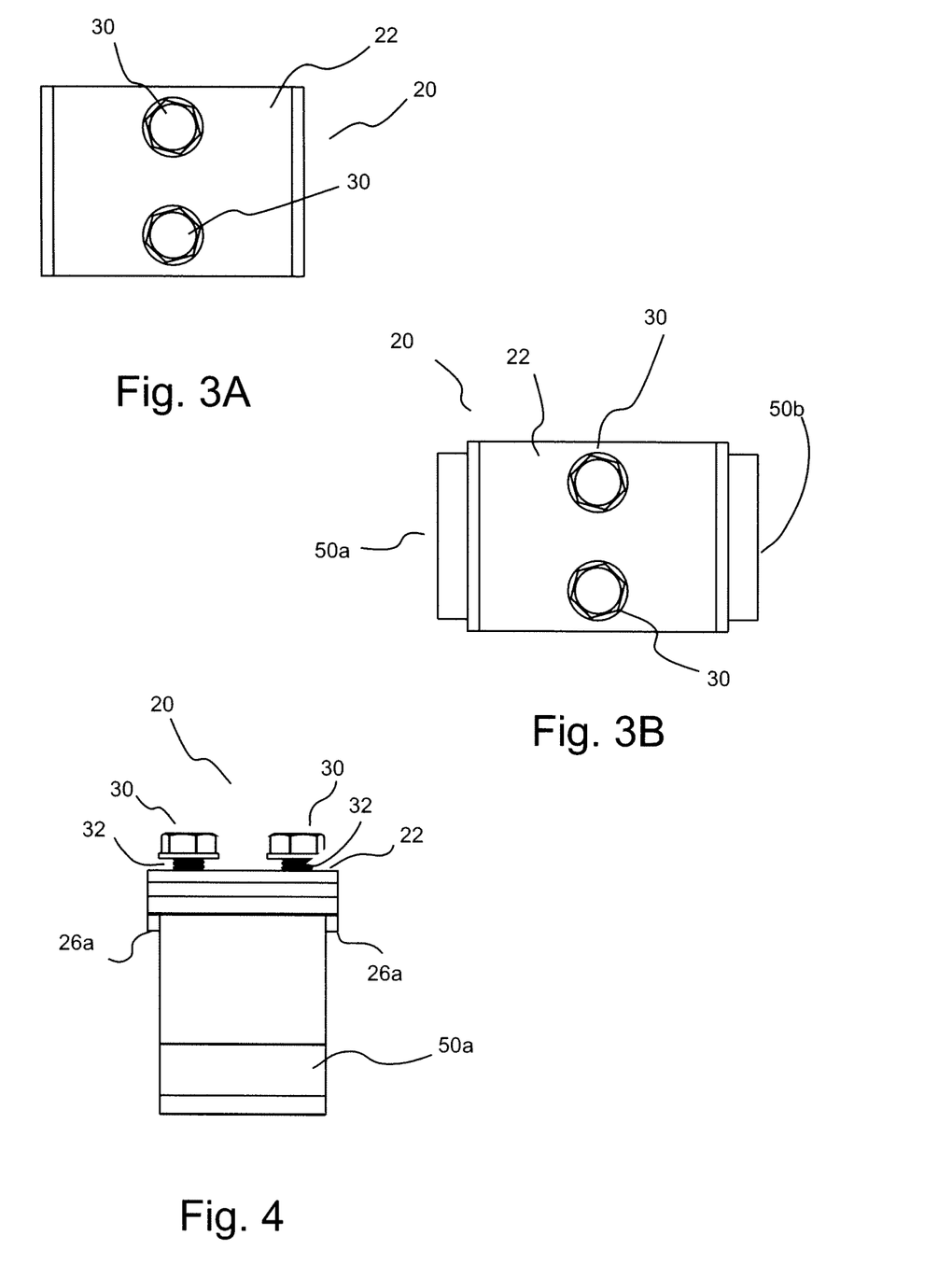
FIG. 3A illustrates a top view of the connector of FIG. 1A wherein the contact or clamp members are in a closed state.
FIG. 3B illustrates a top view of the connector of FIG. 1A wherein the contact or clamp members are in an open state.
FIG. 4 illustrates a side view of the connector of FIG. 1A wherein the contact or clamp members are in a closed state.
Figures 6A, 6B, 6C, 6D:
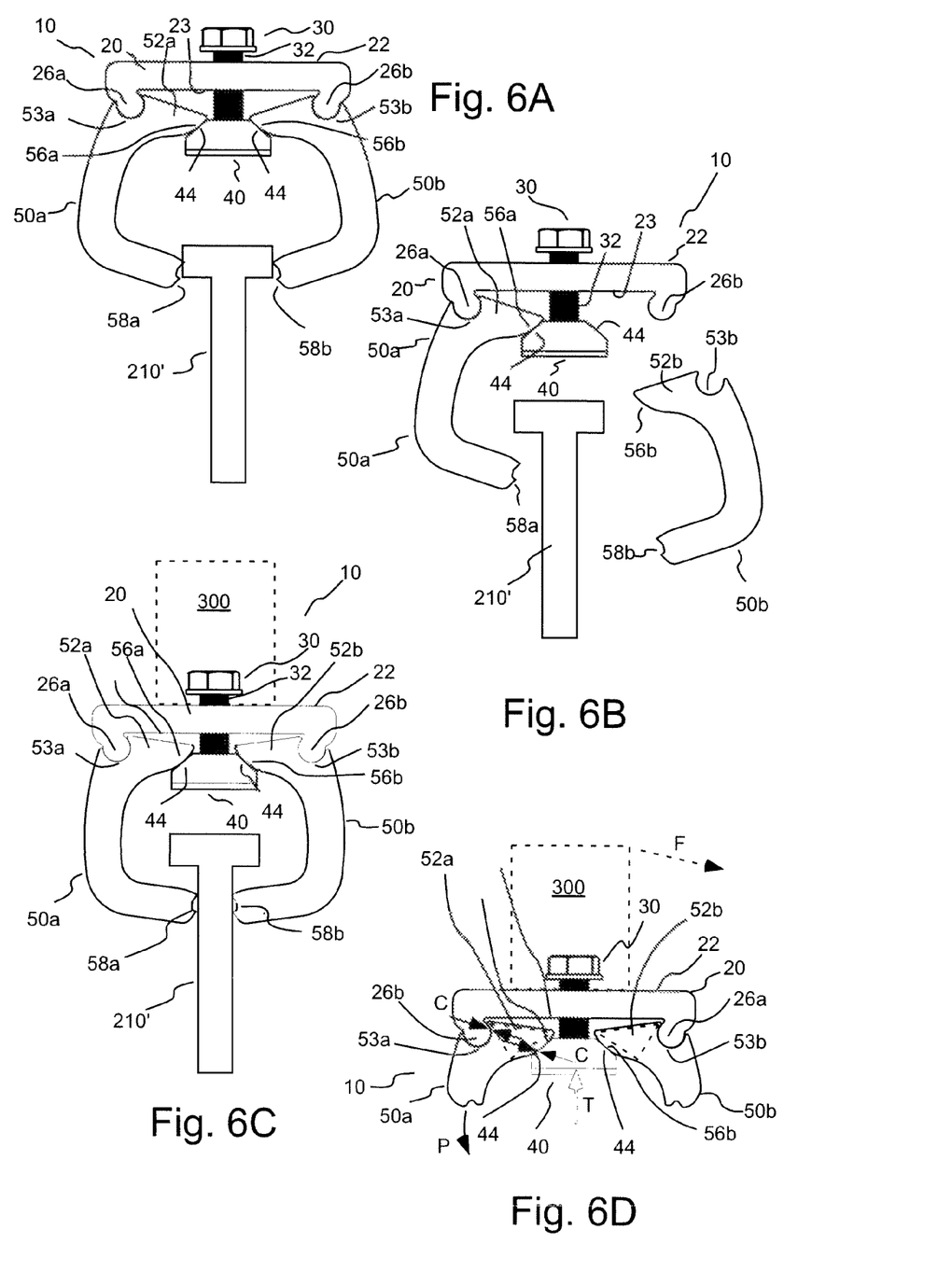
FIG. 6A illustrates a side view of the connector of FIG. 1A being passed over the top of an extending attachment member, anchorage member or anchorage point to position the connector for attachment.
FIG. 6B illustrates a side view of partial disassembly of the connector of FIG. 1A for attachment to an attachment member.
FIG. 6C illustrates a side view of the connector of FIG. 1A in operative connection with an attachment member.
FIG. 6D illustrates a side view of a portion of the connector of FIG. 1A in operative connection with an attachment member and illustrating schematically forces upon the connector resulting from a force on an attached item.

As abutment member 40 moves away from surface 23 of interface member 20 via, for example, counterclockwise or loosening rotation of attachment member(s) 30, contact members 50a and 50b are free to move, to rotate or to pivot to an open position as, for example, illustrated in FIGS. 2B and 6A. In this open position, connector 10 can, for example, be readily placed over a standing seam 210 of a roof 200 or over another extending attachment point or member 210' as, for example, illustrated in FIG. 6A. In the case that an attachment point or member such as attachment member 210' has an upper portion 212' that is overly wide to pass connector 10 thereover (that, wider than the width to which contact surfaces 58a and 58b of contact members 50a and 50b can be separated), one or both of contact members 50a and 50b can be disconnected from connector 10 and reconnected after the remainder of connector 10 is in position for attachment as illustrates in FIG. 6B. One or both of contact members 50a and 50b can, for example, be slid out of connection with the remainder of connector 10 along the direction of axes $A_1$ and $A_2$ or abutment member 40 can be sufficiently lowered on attachment member(s) 30 (or disconnected therefrom) to allow removal one or both of contact members 50a and 50b. Partial or complete disassembly of connector 10 can also assist in attachment when clearance space is limited by one or more objects in the vicinity of an extending attachment member. Once connector 10 is placed in position on standing seam 210, attachment member 210' (or other attachment member) and reassembled, if necessary, clockwise or tightening rotation of attachment member(s) 30 draws abutment member 40 away from the top of standing seam 210 or 210' and toward surface 23 of interface member 20 and pivots contact members 50 inward so that contact surfaces 58a and 58b are drawn into secure contact with standing seam 210 (or other attachment point).

Abutment member 40 thus does no contact standing seam 210, 210' or other extending attachment member during operation connection of connector 10 thereto. Indeed, only contact surfaces 58a and 58b need contact standing seam 210, 210' or other extending attachment member in the illustrated embodiment. Unlike a number of currently available connectors or clamps for standing seams, connector 10 need not be dimensioned for use with a particular extending attachment member or type of extending attachment member and can be used in connection with a wide variety of standing seams for roofs and other extending attachment members.

Once attachment member(s) 30 are sufficiently tightened, the abutting contact between abutment surfaces 44a and 44b of abutment member 40 and abutment surfaces 56a and 56b of contact members 50a and 50b as well as the abutting contact between abutment members 26a and 26b of interface member 20 and cooperating members 52a and 52b capture and/or wedge cooperating sections 52a and 52b between abutment member 40 and interface member 20. Idealized compressive or wedging forces generated thereby are represented by arrows C for one side of connector 10 in FIG. 6D. Resultant, relatively large frictional forces between interface member 20 and contact members 50a and 50b, prevent disconnection of contact members 50a and 50b (whether via sliding in the direction of axes $A_1$ and $A_2$, respectively, or otherwise).

Moreover, as illustrated in FIG. 6D, forces (represented by arrow F) in generally any direction with a horizontal or upward component (in the orientation illustrated in FIG. 6D) on an item (for example, post anchorage system 400) attached via one or more connectors 10 tend to increase compressive forces C as well as tend to increase a pivoting or clamping force (represented by curved arrow P in FIG. 6D) exerted by contact members 50a and 50b upon attachment member 210'. In that regard, forces F on, for example, post anchorage system 300 (or other item connected to connector 10) are translated as an upward or tensile force (represented by open arrow T in FIG. 6D) to abutment member 40 via attachment member(s) 30, thereby increasing the forces applied by abutment member(s) 30 to cooperating sections 52a and 52b of contact members 50a and 50b, respectively, as described above. As a result, interface member 20, including extending abutment members 26a and 26b, as well as channels 53a and 53b of extending contact members 50a and 50b must be of adequate strength and stiffness to accept both the compressive and pivoting forces associated with clamping without failure. Suitable materials and dimensions for such components are readily determined for a particular task using known engineering principles.

Figure 5C:
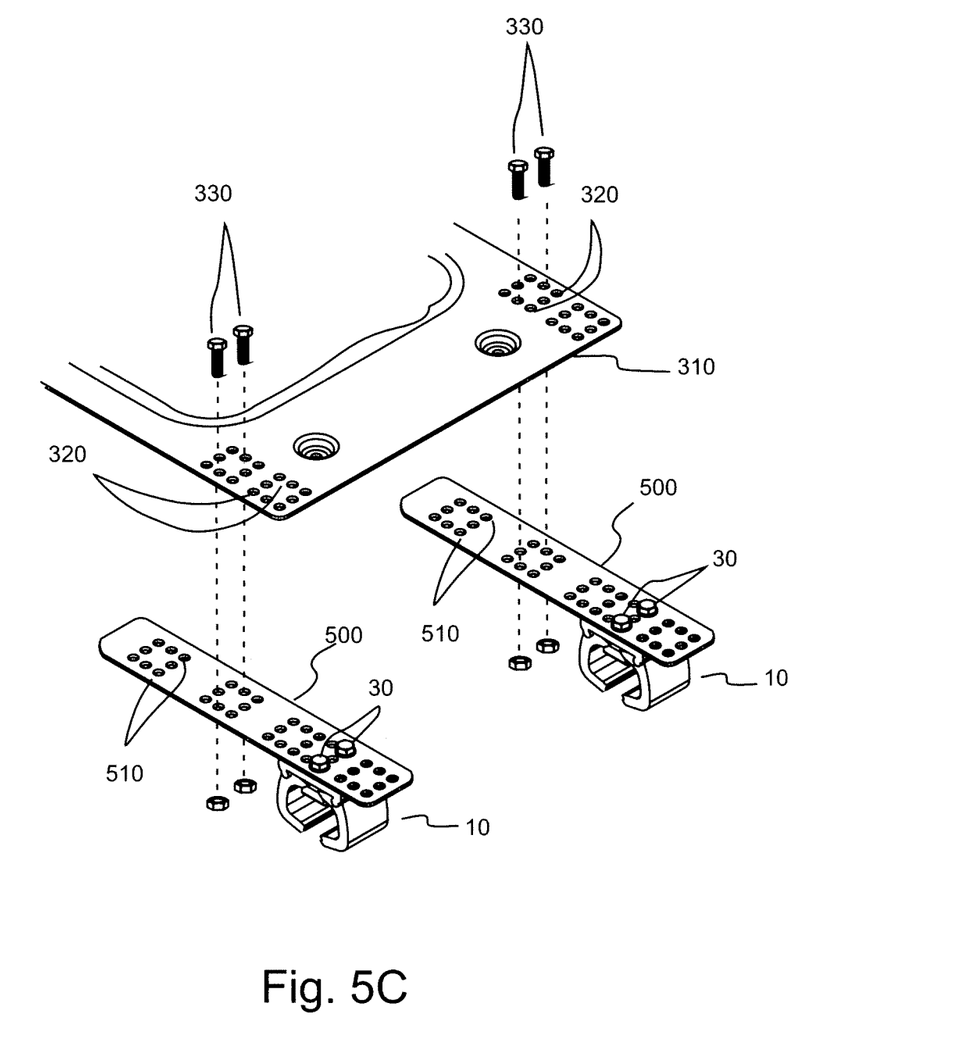
FIG. 5C illustrates a perspective view of a connector of FIG. 1A connecting to an extending member in position to be attached to a base for a post.

A described above in connection with FIGS. 5A and 5B, several (four in the illustrated embodiment) connectors 10 can be attached to base 310 (or other item) to attach base 310 to one or more extending attachment members such as standing seams 210 of roof 200. Connectors 10 can, for example, be readily attached to base 310 (or other item) before attachment to one or more attachment members such as standing seams 210. As illustrated in FIG. 5C, one or more connectors 10 can be attached to an extending member 500 via two attachment members 30 (for example, bolts). Extending members 500 includes a plurality of spaced passages 510 via which extending members 500 can, for example, be attached to base 310 via attachment members such as bolt 330, which pass through spaced passages 320 in base 310 and aligned spaced passages 510 in extending members 500 to connect to cooperating nuts. In this manner base 310 (or other item) can be adapted for use with extending attachment members such as standing seams 210 which are spaced in such a manner that the plurality of spaced passages 320 would otherwise not be suitable for direct attachment of base 310 via connectors 10.

Figure 7A:
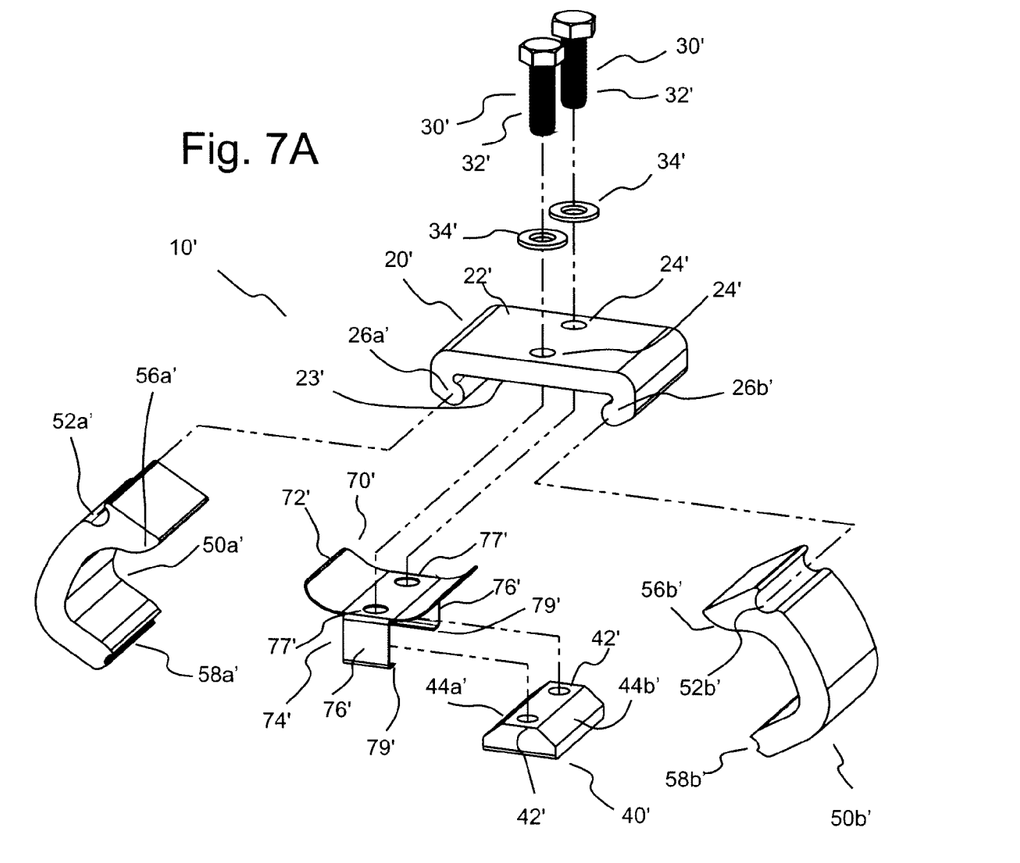
FIG. 7A illustrates a perspective view of another embodiment of a connector in an exploded or disassembled state.
Figure 7B:
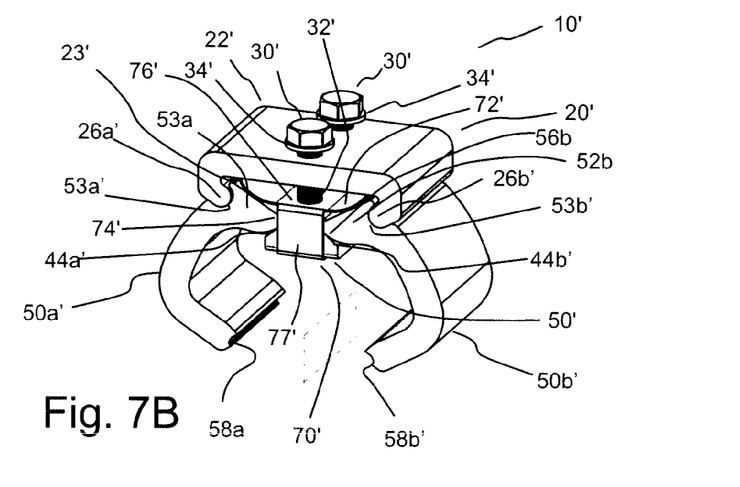
FIG. 7B illustrates a perspective view of the connector of FIG. 7A in an assembled state.

FIGS. 7A through 7C illustrate another embodiment of a connector 10' that is similar in many respects in design and/or operation to connector 10. Elements of connector 10' are numbered similarly to like components of connector 10 with the addition of the designation "'" thereto. Connector 10' includes retention mechanism in the form of a biasing member 70' or other mechanism or system that operates to retain or maintain contact members 50a' and 50b' in an open state wherein contact surfaces 58a' and 58b' are moved or pivoted away from the center line or plane of connector 10 (as defined, for example, by a vertical (in the orientation of the figures) plane passing through the center of passages 24' of interface member 20'; a portion of which plane is illustrated in dashed lines in FIG. 7B). The retention mechanism can alternatively, for example, be a detent mechanism wherein a user opens connector 10 by spreading contact members 50a' and 50b' and the detent mechanism maintains contact members 50a' and 50b' in the open state until sufficient closing force is applied thereto.

In the illustrated embodiment, biasing member 70' includes an arced member 72' formed of a resilient material such as a metal that operates, for example, in the manner of a leaf spring. The lateral ends of arced member 72' contact an underside of interface member 20', while an intermediate, arced section of arced member 72' contacts an upper surface of contact members 50a' and 50b'. Retaining, for example, via biasing, connector 10' and other connectors hereof in an open position facilitates attachment, particularly in the case that an item such as base 310 is first attached to one or more connectors which are used to attach the item to an anchor point or anchor points (for example, parallel extending standing seams). As contact members 50a' and 50b' are moved to a closed position via abutment member 40, arced member 72' is compressed and straightened between interface member 20 and abutment member 40. As abutment member 40 is moved away from interface member 20, arced member 72' returns to its arced state, biasing contact members 50a' and 50b' in an open state.

In the illustrated embodiment, a retaining member 74' (in the approximate form of an inverted U-shaped bracket) is attached to biasing member 72'. In the illustrated embodiment, extending side members 76' of retaining member 74' contact a front and back (in the illustrated orientation) surface of abutment member 40', as well as a front and back surface of contact members 50a' and 50b', thereby preventing contact members 50a' and 50b' from being slid out of contact with interface member 20' and abutment member 40' as described above in connection with connector 10'. Extending members 79' at the end of extending side members 76' contact a lower side of abutment member 40'. In the illustrative embodiment, passages 77' are formed through biasing member 72' and retaining member 74' to retain biasing member 72' and retaining member 74' in operative connection with the remainder of connector 10' while abutment member 40' is connected to threaded sections 32' of attachment members 30'. A user can still disassemble one or both of extending contact members 50a' and 50b' from connector 10' to facilitate connection in certain situations as described above by removing attachment members 30' from connection with abutment member 40'. One or both of side members 76' can, for example, be deflected away from contact with abutment member 40' so that abutment members 40' can be removed from contact with extending members 79' to facilitate disassembly.

FIGS. 8A through 8E illustrate another embodiment of a connector 10" that is similar in many respects both design and/or operation to connector 10. Elements of connector 10" are numbered similarly to like components of connector 10 with the addition of the designation """ thereto. Like connectors 10 an 10', connector 10" includes a biasing member 70" or other mechanism or system that operates to maintain contact members 50a" and 50b" in an open state wherein contact members 50a" and 50b" are pivoted away from the center line or plane of connector 10. Like biasing member 70', biasing member 70" includes an arced member 72" formed of a resilient material such as a metal that operates, for example, in the manner of a leaf spring.

In the embodiment of FIGS. 8A through 8D, a first retaining member 74a" (a U-shaped bracket in the illustrated embodiment) is attached to first extending abutment member 26a" via a threaded passages 27a" and cooperating threaded attachment members 29a" (for example, screws or bolts), which pass through passages 75a" in extending side members 76a". Extending side members 76a" of retaining member 74a" contact a front and back (in the illustrated orientation) surface of contact member 50a", thereby preventing contact member 50a" from being slid out of contact with interface member 20" and abutment member 40" as described above. An intermediate extending member 79a" extends between side members 76a" and contacts an inner surface of contact member 50a and prevents disconnection of first contact member 50a" from interface member 20a" even upon disconnection of abutment member 40" from attachment members 30".

Likewise, a second retaining member 74b" (a U-shaped bracket in the illustrated embodiment) is attached to second extending abutment member 26b" via a threaded passages 27b" and cooperating threaded attachment members 29b" (for example, screws or bolts), which pass through passages 75b" in extending side members 76b". Extending side members 76b" of retaining member 74b" contact a front and back (in the illustrated orientation) surface of contact member 50b", thereby preventing contact member 50b" from being slid out of contact with interface member 20" and abutment member 40' as described above. An intermediate extending member 79b" extends between side members 76b" and contacts an inner surface of contact member 50b and prevents disconnection of first contact member 50b" from interface member 20b" even upon disconnection of abutment member 40" from attachment members 30".

Either of first contact member 50a" or second contact member 50b" can be removed from connection with the remainder of connector 10" by respective removal of either first retaining member 74a" or second retaining member 74b".

Figure 8A:
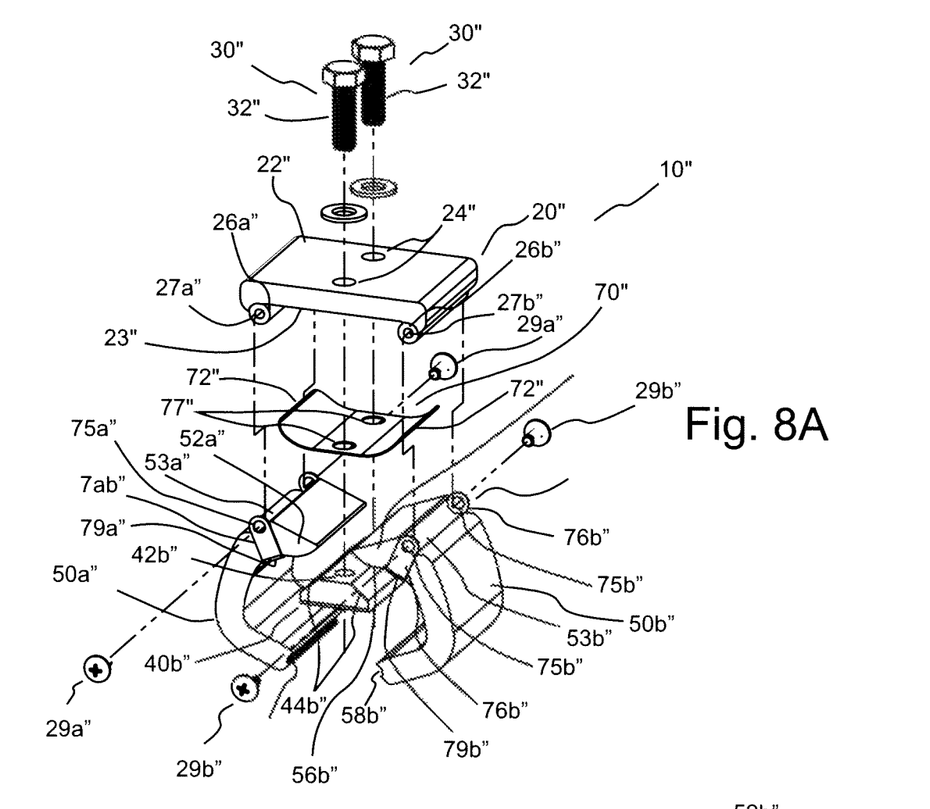
FIG. 8A illustrates a perspective view of another embodiment of a connector in an exploded or disassembled state.
Figure 8B:
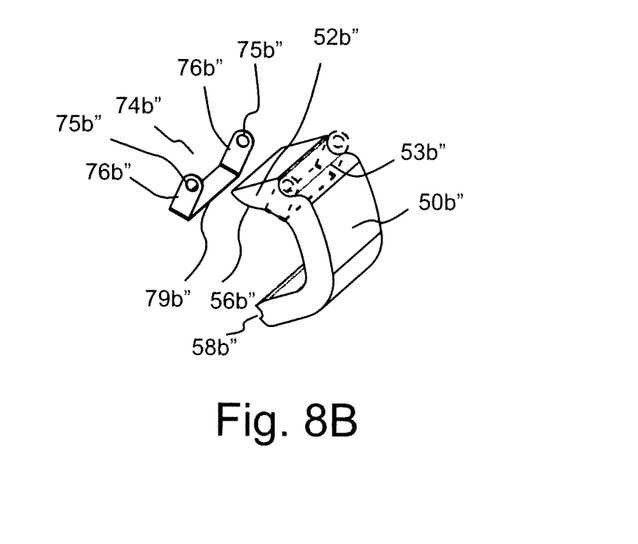
FIG. 8B illustrates a perspective view of a portion of the connector of FIG. 8A.
Figure 8C:
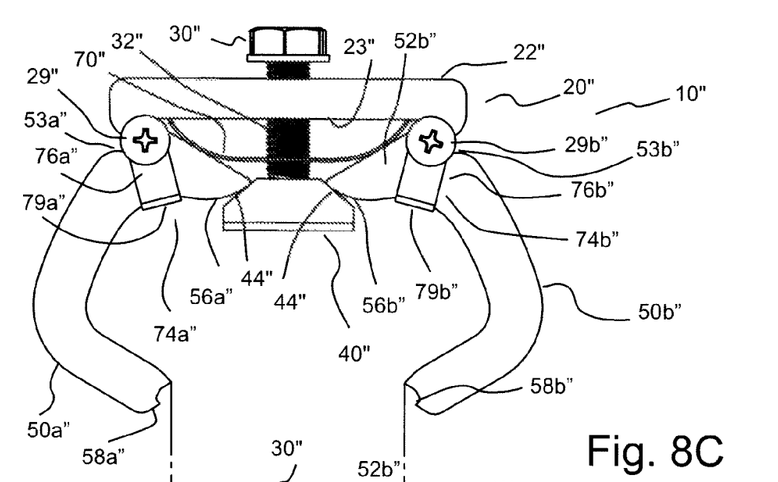
FIG. 8C illustrates a front view of the connector of FIG. 8A in an open state and in a closed state.
Figure 8D:
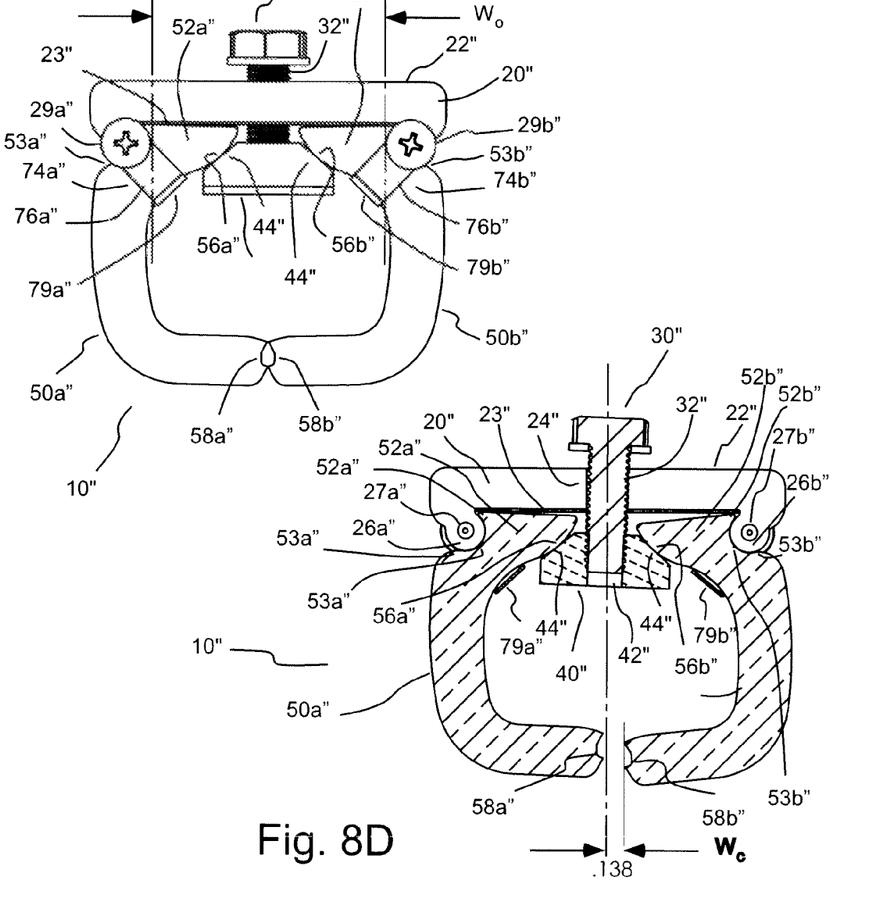
FIG. 8D illustrates a cross-sectional view of the connector of FIG. 8A in a closed state, demonstrating the tolerance of the connector for connection to extending members of varying widths, offsets and spacings.
Figure 8E:
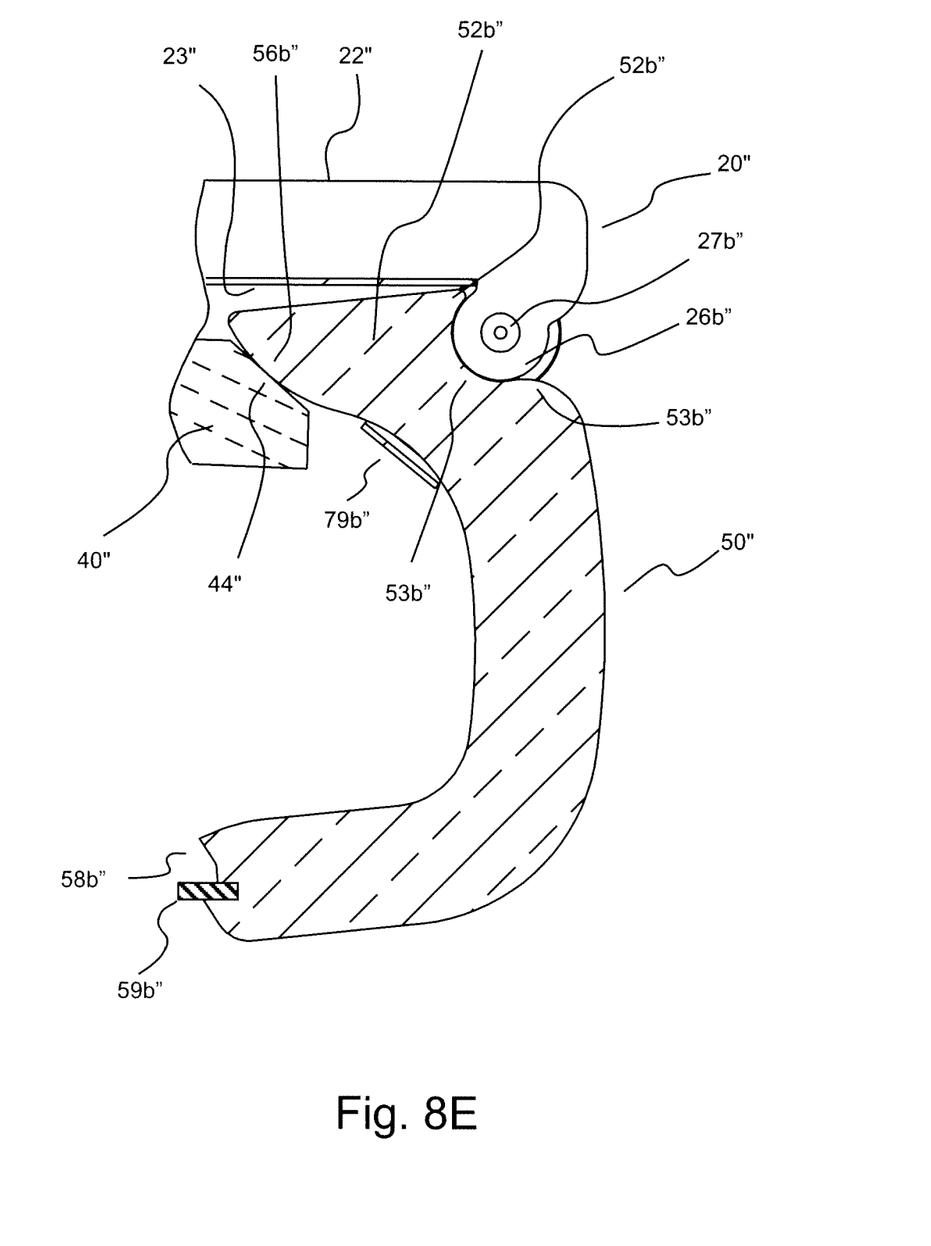
FIG. 8E illustrates an enlarged cross-sectional view of a portion of the connector of FIG. 8A.

As, for example, illustrated in FIGS. 8D and 8E, that portion of arced channels 53a" and 53b" which contacts first extending abutment member 26a" and second extending abutment member 26b" extends less than 180°. Further, an outer portion 53aa" and 53bb" at the lower ends of channels 53a" and 53b", respectively, is arced or curved such that it doesn't contact first extending abutment member 26a" and second extending abutment member 26b" respectively, upon pivoting of first extending contact member 50a" and second extending contact member 50b" to an open position. These features of connector 10" facilitate opening of first extending contact member 50a" and second extending contact member 50b" to a relatively wide position. As, for example, illustrated in FIG. 8C, contact members 50a" and 50b" can (in several embodiments) be open such that a distance $W_o$ between contact surfaces 58a" and 58b" is at least approximately as wide as the widest distance between the inner surfaces of contact members 50a" and 50b" when in the closed position. Thus, $W_o$ can be as wide as the widest upper portion (for example, an upper flange as illustrated in FIGS. 6A through 6C) of a standing seam (or other extending attachment) to which connector 10" can be connected. In the illustrated embodiments, first extending contact member 50a" and second extending contact member 50b" are arced or curved to facilitate attachment to a standing seam (or other extending attachment) having a wider, flared or flanged upper or distal portion.

As discussed above, passages 24" in interface member 20" can be dimensioned to be larger the threaded portions 32" of attachment members 30". As illustrated in FIG. 8D, such dimensioning of passages 24" enables attachment members 32" and abutment member 40" to be tilted or angled such that contact surfaces 58a" and 58b" do not align and gap to a varying degree when in a closed position (compare FIG. 8C with FIG. 8D). This range of positions of attachment members 32" (and corresponding ranges of positions of abutment member 40" and contact members 50a" and 50b") facilitates attachment of connectors 10" to standing seams (or other extending attachments) that are irregularly spaced or shaped, particularly when multiple connectors are used in operative connection as illustrated in FIGS. 5A and 5B.

In several embodiments, interface member 20", abutment member 40", first contact member 50a" and second contact member 50b" (and like elements or components of other connectors hereof) were each formed separately and monolithically from extruded aluminum. Elements such as biasing member 70" and retaining members 74a" and 74b" (and like elements or components of other connectors hereof) are not load bearing elements when connector 10" is in operation. Since retaining members 74a" and 74b" (as well as retaining member 74') are not load bearing, such elements can, for example, be formed via bending and/or other forming of relatively thin material such as plastic, aluminum or stainless steel.

In the case that extending contact members 50a" and 50b" are formed from aluminum, surfaces 58a" and 58b" can, for example, be anodized to harden contact surfaces 58a" and 58b". Such hardening can prevent deformation and provide for extended use. Alternatively, one or more contact members 59b" (see FIG. 8E) can be operatively attached to contact surface 58b" (as well as contact surface 58a"), which are formed from a material harder than aluminum (for example, steel).

As described above, the connectors hereof are suitable for use in attaching items to, for example, standing seam roofing. The connectors are self centering and self aligning. Moreover, one or more of the connectors can be pre-assembled or pre-connected to an item, an attachment plate or a base for quick and easy installation. The ease of use and durability of the connectors hereof readily allow for temporary use and multiple or moveable installations.

The connectors hereof provide high stiffness in connection with a "top-tightening" design to facilitate connection. In several embodiment, only two attachment members per connector provide for quick tightening. A wide range of connecting or clamping widths enable the connectors to be used in connection with a wide variety of, for example, standing seam widths and profiles. Moreover, as described above, the forces on the abutment members of the connectors hereof result in a tendency of the connectors to self tighten when experiencing a force with a vertical component. Further, the connectors remain connected under relatively high dynamic and/or static loads. The wedging action and/or self tightening properties of the connectors hereof (as described above) provide clamping loads sufficient to withstand vertical (in the orientation of the figures) loading forces of 2,000 pounds or greater. In several studies of a non-optimized embodiment of a connector hereof, the connector withstood at least 2,300 pounds of vertical loading force. Thus, use of two such connectors can provide vertical loading forces well in excess of 4,000 pounds. The connectors hereof are able to withstand such loading forces when connected for an extended period of time and can be repeatedly disconnected and reconnected, while continuing to provide such loading characteristics. The connectors hereof are thus, for example, well suited for use in connection with or as an element of fall protection systems.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A connector for connecting to an extending member comprising:
    an interface member the interface member comprising an interface surface a first extending abutment member extending from a surface opposed to the interface surface a second extending abutment member spaced from the first extending abutment member and extending from the surface opposed to the interface surface and at least a first passage passing therethrough from the interface surface to the surface opposing the interface surface between the first extending abutment member and the second extending abutment member;
    an abutment member comprising at least a first threaded passage,
    at least a first threaded member adapted to extend through the first passage in the interface surface to engage the first threaded passage of the abutment member on the side of the surface opposed to the interface surface;
    a first extending contact member comprising a first cooperating section and a first contact surface on an end thereof, the first cooperating section being movably positioned between and abutted by the abutment member and the first extending abutment member so that the first contact surface of the first extending contact member can be moved between an open position and a closed position as the distance between the surface opposing the interface surface and the abutment member is adjusted via the first threaded member, and
    a second extending contact member comprising a second cooperating section and a second contact surface on an end thereof, the second cooperating section being movably positioned between and abutted by the abutment member and the second extending abutment member so that the second contact surface of the second extending contact member can be moved between an open position and a closed position as the distance between the surface opposing the interface surface and the abutment member is adjusted via the first threaded member; and
    wherein the first extending abutment member extends at an angle from the surface opposed to the interface surface toward the second extending abutment member, the first extending abutment member comprising an arced surface to contact an arced channel formed in the first cooperating section of the first extending contact member and the second extending abutment member extends at an angle from the surface opposed to the interface surface toward the first extending abutment member, the second extending abutment member comprising an arced surface to contact an arced channel formed in the second cooperating section of the second extending contact member.

2. The connector of claim 1 wherein the arced channel of the first cooperating section extends less than 180° and the arced channel of the second cooperating section extends less than 180°.

3. The connector of claim 1 wherein the interface member further comprises a second passage passing therethrough from the interface surface to the surface opposing the interface surface between the first extending abutment member and the second extending abutment member, and wherein the abutment member comprise a second threaded passage the connector further comprising a second threaded member adapted to extend through the second passage in the interface member to engage the second threaded passage of the abutment member.

4. The connector of claim 1 wherein the first threaded member and the second threaded member are further adapted to attach an item to the interface surface of the interface member.

5. The connector of claim 1 further comprising at least one retention mechanism to retain at least one of the first extending contact member and second extending contact member in an open position.

6. The connector of claim 1 further comprising at least one retention mechanism to retain the first extending contact member in an open position and the second extending contact member n an open position.

7. The connector of claim 6 wherein the retention mechanism comprises an arced resilient member comprising a first end contacting the surface opposed to the interface surface and a second end contacting the surface opposed to the interface surface and positioned between the surface opposed to the interface surface and the abutment member, a first arced section of the resilient member contacting the first extending contact member and a second arced section of the resilient member contacting the second extending contact member.

8. The connector of claim 6 comprising a first retaining member in operative connection with the interface member to abut the first extending contact member and retain the first cooperating section in operative connection with the interface member and a second retaining member in operative connection with the interface member to abut the second extending contact member and retain the second cooperating section in operative connection with the interface member.

9. The connector of claim 1 comprising at least one retaining member in operative connection with the interface member to abut the first cooperating section of the first extending contact member and retain the first cooperating section in operative connection with the interface member and the abutment member and to abut the second cooperating section of the second extending contact member and retain the second cooperating section in operative connection with the interface member and the abutment member.

10. The connector of claim 8 wherein the first retaining member comprises a first bracket rotatably attached to the interface member and extending around the first extending contact member and the second retaining member comprises a second bracket rotatably attached to the interface member and extending around the second extending contact member.

11. The connector of claim 10 wherein the first bracket is removable from connection with the interface member via at least one attachment member and the second bracket is removable from connection with the interface member via at least one attachment member.

12. The connector of claim 11 wherein the retention mechanism comprises an arced resilient member comprising a first end contacting the surface opposed to the interface surface and a second end contacting the surface opposed to the interface surface and positioned between the surface opposed to the interface surface and the abutment member, a first arced section of the resilient member contacting the first extending contact member and a second arced section of the resilient member contacting the second extending contact member.

13. A connector for connecting to an extending member comprising:
an interface member, the interface member comprising an interface surface, a first extending abutment member extending from a surface opposed to the interface surface, a second extending abutment member spaced from the first extending abutment member and extending from the surface opposed to the interface surface, and at least a first passage passing therethrough from the interface surface to the surface opposing the interface surface between the first extending abutment member and the second extending abutment member;
an abutment member comprising at least a first threaded passage,
at least a first threaded member adapted to extend through the first passage in the interface surface to engage the first threaded passage of the abutment member on the side of the surface opposed to the interface surface;
a first extending contact member comprising a first cooperating section and a first contact surface on an end thereof, the first cooperating section being movably positioned between and abutted by the abutment member and the first extending abutment member so that the first contact surface of the first extending contact member can be moved between an open position and a closed position as the distance between the surface opposing the interface surface and the abutment member is adjusted via the first threaded member, and
a second extending contact member comprising a second cooperating section and a second contact surface on an end thereof, the second cooperating section being movably positioned between and abutted by the abutment member and the second extending abutment member so that the second contact surface of the second extending contact member can be moved between an open position and a closed position as the distance between the surface opposing the interface surface and the abutment member is adjusted via the first threaded member,
wherein the first extending abutment member comprises an arced surface to contact an arced channel formed in the first cooperating section of the first extending contact member, and the second extending abutment member comprises an arced surface to contact an arced channel formed in the second cooperating section of the second extending contact member.

14. The method of claim 13 wherein the item is attached to the interface surface before the connector is attached to the standing seam.

15. A method of connecting an item to a standing seam of a roof comprising:
attaching at least one connector to the standing seam, the connector comprising:
an interface member, the interface member comprising an interface surface, a first extending abutment member extending from a surface opposed to the interface surface, a second extending abutment member spaced from the first extending abutment member and extending from the surface opposed to the interface surface, and at least a first passage passing therethrough from the interface surface to the surface opposing the interface surface between the first extending abutment member and the second extending abutment member;
an abutment member comprising at least a first threaded passage,
at least a first threaded member adapted to extend through the first passage in the interface surface to engage the first threaded passage of the abutment member on the side of the surface opposed to the interface surface;
a first extending contact member comprising a first cooperating section and a first contact surface on an end thereof to contact and grip the standing seam, the first cooperating section being movably positioned between and abutted by the abutment member and the first extending abutment member so that the first contact surface of the first extending contact member can be moved between an open position and a closed position as the distance between the surface opposing the interface surface and the abutment member is adjusted via the first threaded member; and a second extending contact member comprising a second cooperating section and a second contact surface on an end thereof to contact and grip the standing seam, the second cooperating section being movably positioned between and abutted by the abutment member and the second extending abutment member so that the second contact surface of the second extending contact member can be moved between an open position and a closed position as the distance between the surface opposing the interface surface and the abutment member is adjusted via the first threaded member; and attaching the item to the interface surface of the at least one connector, wherein the first extending abutment member comprises an arced surface to contact an arced channel formed in the first cooperating section of the first extending contact member, and the second extending, abutment member comprises an arced surface to contact an arced channel formed in the second cooperating section of the second extending contact member.

16. An anchor system for attachment to a roof comprising a standing seam, comprising:

a base, an anchor member attached to an upper surface of the base; and at least one connector attached to a lower surface of the base and adapted to attach to the standing seam, the at least one connector comprising:

an interface member, the interface member comprising an interface surface, a first extending abutment member extending from a surface opposed to the interface surface, a second extending abutment member spaced from the first extending abutment member and extending from the surface opposed to the interface surface, and at least a first passage passing therethrough from the interface surface to the surface opposing the interface surface between the first extending abutment member and the second extending abutment member;

an abutment member comprising at least a first threaded passage, at least a first threaded member adapted to extend through the first passage in the interface surface to engage the first threaded passage of the abutment member on the side of the surface opposed to the interface surface;

a first extending contact member comprising a first cooperating section and a first contact surface on an end thereof to contact and grip the standing seam, the first cooperating section being movably positioned between and abutted by the abutment member and the first extending abutment member so that the first contact surface of the first extending contact member can be moved between an open position and a closed position as the distance between the surface opposing the interface surface and the abutment member is adjusted via the first threaded member, and a second extending contact member comprising a second cooperating section and a second contact surface on an end thereof to contact and grip the standing seam, the second cooperating section being movably positioned between and abutted by the abutment member and the second extending abutment member so that the second contact surface of the second extending contact member can be moved between an open position and a closed position as the distance between the surface opposing the interface surface and the abutment member is adjusted via the first threaded member, wherein the first extending abutment member comprises an arced surface to contact an arced channel formed in the first cooperating section of the first extending contact member, and the second extending abutment member comprises an arced surface to contact an arced channel formed in the second cooperating section of the second extending contact member.

17. A connector for connecting to an extending member comprising:

an interface member the interface member comprising an interface surface, a first extending abutment member extending from a surface opposed to the interface surface and a second extending abutment member spaced from the first extending abutment member and extending from the surface opposed to the interface surface;

an abutment member in operative connection with the interface member and positioned adjacent the surface opposed to the interface surface such that a distance between the abutment member and the surface opposed to the interface surface is adjustable;

a first extending contact member comprising a first cooperating section and a first contact surface on an end thereof, the first cooperating section being movably positioned between and abutted by the abutment member and the first extending abutment member so that the first contact surface of the first extending contact member can be moved between an open position and a closed position as the distance between the surface opposing the interface surface and the abutment member is adjusted, and a second extending contact member comprising a second cooperating section and a second contact surface on an end thereof, the second cooperating section being movably positioned between and abutted by the abutment member and the second extending abutment member so that the second contact surface of the second extending contact member can be moved between an open position and a closed position as the distance between the surface opposing the interface surface and the abutment member is adjusted, wherein the first extending abutment member comprises an arced surface to contact an arced channel formed in the first cooperating section of the first extending contact member, and the second extending abutment member comprises an arced surface to contact an arced channel formed in the second cooperating section of the second extending contact member.

* * * * *